(12) United States Patent
Määttanen et al.

(10) Patent No.: US 10,178,536 B2
(45) Date of Patent: Jan. 8, 2019

(54) UPDATE INDICATION INFORMATION

(71) Applicant: Telefonaktiebolaget LM Ericsson (publ), Stockholm (SE)

(72) Inventors: Helka-Liina Määttanen, Helsinki (FI); Jens Bergqvist, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/551,614

(22) PCT Filed: Jun. 21, 2017

(86) PCT No.: PCT/SE2017/050687
§ 371 (c)(1),
(2) Date: Aug. 17, 2017

(87) PCT Pub. No.: WO2018/030933
PCT Pub. Date: Feb. 15, 2018

(65) Prior Publication Data
US 2018/0234826 A1 Aug. 16, 2018

Related U.S. Application Data

(60) Provisional application No. 62/374,474, filed on Aug. 12, 2016.

(51) Int. Cl.
*H04W 4/90* (2018.01)
*H04W 4/12* (2009.01)
(Continued)

(52) U.S. Cl.
CPC .............. *H04W 4/90* (2018.02); *H04W 4/06* (2013.01); *H04W 4/12* (2013.01); *H04W 4/70* (2018.02);
(Continued)

(58) Field of Classification Search
CPC ....... H04W 4/90; H04W 76/50; H04W 68/02; H04W 4/70; H04W 4/06; H04W 72/042; H04W 4/12
See application file for complete search history.

(56) References Cited

U.S. PATENT DOCUMENTS

2015/0146604 A1* 5/2015 Kim ................. H04W 4/06 370/312
2015/0249912 A1 9/2015 Lee et al.
2017/0105166 A1* 4/2017 Lee ................. H04W 16/24

OTHER PUBLICATIONS

3rd Generation Partnership Project, "3rd Generation Partnership Project; Technical Specification Group Radio Access Network; Evolved Universal Terrestrial Radio Access (E-UTRA); User Equipment (UE) procedures in idle mode (Release 13)"; Technical specification, 3GPP TS 36.304 V13.2.0, Jun. 1, 2016, pp. 1-46, 3GPP, Valbonne, France.

(Continued)

*Primary Examiner* — Margaret G Mastrodonato
(74) *Attorney, Agent, or Firm* — Coats & Bennett, PLLC

(57) ABSTRACT

According to a first exemplary embodiment of the invention, a method provides update indication information from a radio network node to one or more wireless devices unreachable via a paging channel or a machine-type communication, MTC, control channel. The method comprises generating (112) an update signal comprising a Downlink Control Information, DCI, message by including the update indication information in the update signal, the update indication information comprising at least one indication unrelated to paging the one or more wireless devices, and transmitting (122) the update signal to the one or more wireless devices via a Physical Downlink Control Channel, PDCCH, when the one or more wireless devices are unreachable via the paging channel or the MTC control channel. Further embodiments of the invention includes e.g. methods of (Continued)

handling update indication information and corresponding radio network nodes and wireless devices.

14 Claims, 6 Drawing Sheets

(51) Int. Cl.
    *H04W 4/06*         (2009.01)
    *H04W 68/02*       (2009.01)
    *H04W 72/04*       (2009.01)
    *H04W 4/70*         (2018.01)

(52) U.S. Cl.
    CPC ......... *H04W 68/02* (2013.01); *H04W 72/042* (2013.01)

(56) References Cited

OTHER PUBLICATIONS

3rd Generation Partnership Project, 3rd Generation Partnership Project; Technical Specification Group Radio Access Network; Evolved Universal Terrestrial Radio Access (E-UTRA); Multiplexing and channel coding (Release 13); Technical specification, 3GPP TS 36.212 V13.2.0, Jun. 1, 2016, pp. 1-138, 3GPP, Valbonne, France.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 13)," Technical specification, 3GPP TS 36.331 V13.2.0, Jun. 1, 2016, pp. 1-613, 3GPP, Valbonne, France.

3rd Generation Partnership Project, "3rd Generation Partnership Project; Technical Specification Group Radio Access Network; Evolved Universal Terrestrial Radio Access (E-UTRA); Physical layer procedures (Release 13)," Technical specification, 3GPP TS 36.213 V13.2.0, Jun. 1, 2016, pp. 1-6, 3GPP, Valbonne, France.

3rd Generation Partnership Project, "3rd Generation Partnership Project; Technical Specification Group Radio Access Network; Evolved Universal Terrestrial Radio Access (E-UTRA); Services provided by the physical layer (Release 13)," Technical specification, 3GPP TS 36.302 V13.2.0, Jun. 1, 2016, pp. 1-27, Valbonne, France.

3rd Generation Partnership Project, "3rd Generation Partnership Project; Technical Specification Group Radio Access Network; Evolved Universal Terrestrial Radio Access (E-UTRA); Medium Access Control (MAC) protocol specification (Release 13)," Technical specification, 3GPP TS 36.321 V13.2.0, Jun. 1, 2016, pp. 1-90, Valbonne, France.

* cited by examiner

UPDATE INDICATION INFORMATION

TECHNICAL FIELD

Embodiments disclosed herein relate to methods, computer programs and apparatus in for wireless communication, and particularly relate to methods and apparatus for providing and handling update indication information.

BACKGROUND

A multicast or broadcast transmission conveys information to a group of wireless devices efficiently in terms of the radio resources used. Moreover, such a transmission may reduce the amount of time needed to deliver the information to the group of devices, as compared to for example multiple unicast transmissions. A multicast or broadcast transmission may be realized using transmission schemes such as Multimedia Broadcast Multicast Services (MBMS) Single-Frequency Network (SFN) transmission or Single-Cell Point-to-Multipoint (SC-PTM) transmission.

Challenges faced in performing multicast or broadcast include informing wireless devices about control information for the multicast or broadcast service. In SC-PTM, part of the control information is sent over Single-Cell Multicast Control Channel (SC-MCCH) logical channel. 3GPP TS 36.321. Devices interested in receiving multicast/broadcast service are not expected to monitor this channel continuously, but an indication of change to this information is indicated on a continuously monitored physical downlink control channel (PDCCH) addressed by a special radio network temporary identifier; namely, SC-N-RNTI. 3GPP TS 36.213; 36.302; 36.331. Likewise for Multimedia Broadcast Multicast Service (MBMS) SFN (MBSFN), part of the control information is sent over Multicast Control Channel (MCCH). Changes are indicated on PDCCH addressed by M-RNTI in this case.

Continuous monitoring of a control channel such as PDCCH consumes scarce power resources, especially for devices such as Machine-Type Communication (MTC), narrowband internet of things (NB-IoT) devices, and the like. Monitoring SC-N-RNTI or M-RNTI for SC-MCCH or MCCH change, therefore, proves problematic in that it increases device power consumption and radio resource usage. Further, there are concerns with how to provide various update indications to wireless devices that are not monitoring a particular channel.

SUMMARY

The solution presented herein conveys various update indications from the radio network node to one or more wireless devices that are unreachable via a paging channel or an MTC control channel, which refers to any wireless device that cannot be paged because these channels do not exist on the carrier received by the wireless device, because the wireless device is not monitoring or is unable to monitor these channels, because the information is not sent via these channels, and/or because the wireless device cannot receive these channels. To that end, the solution presented herein includes update indication information in an update signal provided to these unreachable wireless devices, where the wireless device processes the received update signal to identify/determine the indication(s) in the update indication information.

One exemplary method provides update indication information from a radio network node to one or more wireless devices unreachable via a paging channel or a machine-type communication (MTC) control channel. The method comprises generating an update signal comprising a Downlink Control Information (DCI) message by including the update indication information in the update signal, the update indication information comprising at least one indication unrelated to paging the one or more wireless devices, and transmitting the update signal to the one or more wireless devices via a Physical Downlink Control Channel (PDCCH) when the one or more wireless devices are unreachable via the paging channel or the MTC control channel.

One exemplary radio network node configured to provide update indication information to one or more wireless devices unreachable via a paging channel or a machine-type communication (MTC) control channel comprises a processor circuit and a communication circuit. The processor circuit is configured to generate an update signal comprising a Downlink Control Information (DCI) message by including the update indication information in the update signal, the update indication information comprising at least one indication unrelated to paging the one or more wireless devices. The communication circuit is configured to transmit the update signal to the one or more wireless devices via a Physical Downlink Control Channel (PDCCH) when the one or more wireless devices are unreachable via the paging channel or the MTC control channel.

In another exemplary embodiment, a computer program product stored in a non-transitory computer readable medium controls a radio network node configured to provide update indication information from the radio network node to one or more wireless devices unreachable via a paging channel or a machine-type communication (MTC) control channel. The computer program product comprises software instructions which, when run on a processor circuit in the radio network node, causes the radio network node to generate an update signal comprising a Downlink Control Information (DCI) message by including the update indication information in the update signal, the update indication information comprising at least one indication unrelated to paging the one or more wireless devices, and transmit the update signal to the one or more wireless devices via a Physical Downlink Control Channel (PDCCH) when the one or more wireless devices are unreachable via the paging channel or the MTC control channel.

One exemplary method handles update indication information transmitted from a radio network node and received by a wireless device unreachable via a paging channel or a machine-type communication (MTC) control channel. The method comprises receiving, via a Physical Downlink Control Channel (PDCCH), an update signal comprising update indication information included in a Downlink Control Information (DCI) message, the update indication information comprising at least one indication unrelated to paging the wireless device, and processing the update signal to determine the at least one indication.

One exemplary wireless device is configured to handle update indication information from a radio network node when the wireless device is unreachable via a paging channel or a machine-type communication (MTC) control channel. The wireless device comprises a processor circuit and a communication circuit. The communication circuit is configured to receive, via a Physical Downlink Control Channel (PDCCH), an update signal comprising update indication information included in a Downlink Control Information (DCI) message, the update indication information comprising at least one indication unrelated to paging the wireless device. The processor circuit is configured to process the update signal to determine the at least one indication.

In another exemplary embodiment, a computer program product stored in a non-transitory computer readable medium controls a wireless device configured to handle update indication information from a radio network node, where the wireless device is unreachable via a paging channel or a machine-type communication (MTC) control channel. The computer program product comprises software instructions which, when run on a processor circuit in the wireless device, causes the wireless device to receive, via a Physical Downlink Control Channel (PDCCH), an update signal comprising update indication information included in a Downlink Control Information (DCI) message, the update indication information comprising at least one indication unrelated to paging the wireless device, and process the update signal to determine the at least one indication.

Another exemplary radio network node comprises a radio network node configured to provide update indication information to one or more wireless devices unreachable via a paging channel or a machine-type communication (MTC) control channel. The radio network node comprises a generating module and a transmitting module. The generating module is configured to generate an update signal comprising a Downlink Control Information (DCI) message by including the update indication information in the update signal. The update indication information comprises at least one indication unrelated to paging the one or more wireless devices. The transmitting module is configured to transmit the update signal to the one or more wireless devices via a Physical Downlink Control Channel (PDCCH) when the one or more wireless devices are unreachable via the paging channel or the MTC control channel.

Another exemplary wireless device comprises a wireless device configured to handle update indication information from a radio network node when the wireless device is unreachable via a paging channel or a machine-type communication (MTC) control channel. The wireless device comprises a receiving module and a reading module. The receiving module is configured to receive, via a Physical Downlink Control Channel (PDCCH) an update signal comprising update indication information included in a Downlink Control Information (DCI) message. The update indication information comprises at least one indication unrelated to paging the wireless device. The reading module is configured to process the update signal to determine the at least one indication.

DETAILED DESCRIPTION

Figure 1:
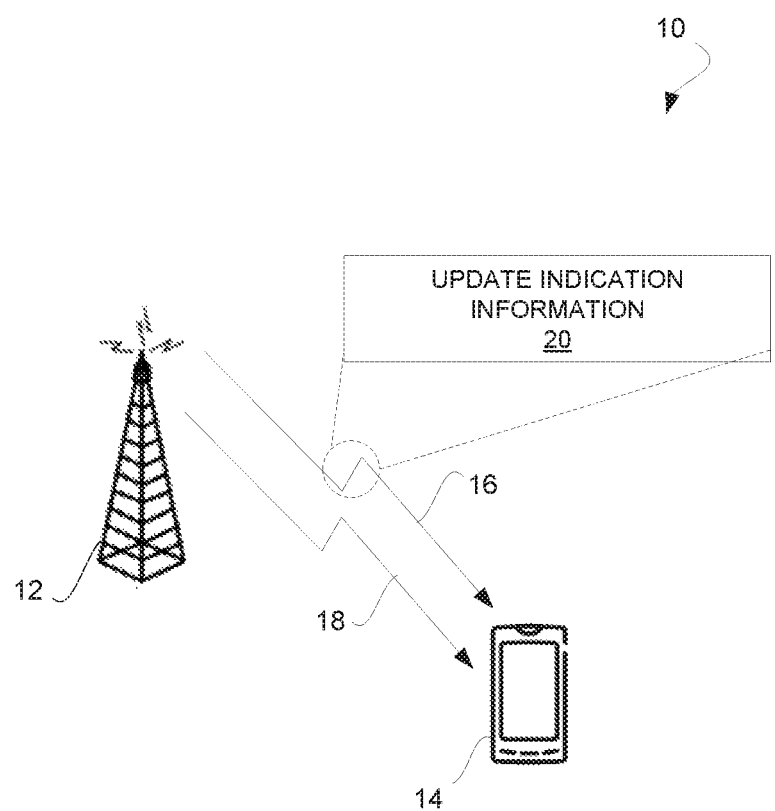
FIG. 1 shows an exemplary wireless communication system.

A work item to enhance MBMS operation was approved in RAN#71 in RP-160675 and further revised in RAN#72 in RP-161297 and reads as follows:

The objective of the work item is to evaluate and specify the following eMBMS enhancements for LTE:
  a. Specify means of using a longer cyclic prefix (e.g. greater than 33.33 µs) for use in a mixed unicast/eMBMS carrier for large SFN delay spread environment (e.g. 15 km or larger inter-site distance), which guarantees coexistence of the legacy and new prefixes on the same carrier, while achieving a spectral efficiency of at least 2 bps/Hz. This objective includes evaluation. (RAN1, RAN4)
  b. Specify means of using subframes 0, 4, 5, 9 (FS1) and 0, 1, 5, 6 (FS2) for MBSFN. (RAN2, RAN1) The non-MBSFN subframes for unicast can only be used as Scell
  c. Specify means of configuring MBSFN subframes without a unicast control region and cell-specific reference signals. (RAN1, RAN2)

Note: Both connected and idle mode FeMBMS operation are included.

Study the following:
  d. Support for standalone carrier with all DL subframes dedicated to MBSFN transmission and self-contained eMBMS signaling including information of SIB13, SIB15, SIB16. (RAN2)
  e. Support for multi-carrier eMBMS/unicast operation involving reception from one or more eMBMS cells that may be non-collocated and asynchronous with one or more cells that are simultaneously used for unicast. (RAN4, RAN2)
  f. Solutions where a UE can receive the TV transport service without being authenticated (RAN1, RAN2, RAN3)

Specify necessary UE RF and BS RF core requirements for new CP length (if defined) for eMBMS. (RAN4)

No new TDD DL/UL configuration for FS2 is considered in this WI

This work will consider the outcome of the corresponding SA2 work

The work for the Evolved Multimedia Broadcast Multicast Service (eMBMS) started in previous RAN1#84bis meeting where the following clarifications concerning objectives b) and c) of the WID were concluded: Objectives b and c mean that legacy User Equipments (UEs) cannot be scheduled on the carrier. The reason that subframes 0, 4, 5, 9 (FS1) and 0, 1, 5, 6 (FS2) currently cannot be used for MBSFN transmission is that they carry PSS/SSS/PBCH on subframes 0 and 5 (FS1, FS2) and paging channel on subframes 0, 4, 5, and 9 (FS1), 0, 1, 5, and 6 (FS2) with the densest paging configuration. As MBMS allocations are full-bandwidth, i.e. all Physical Resource Blocks (PRBs) are allocated, PSS/SSS/PBCH (Primary Synchronization Signal/Secondary Synchronization Signal/Physical Broadcast Channel) and paging messages cannot be frequency multiplexed with the Physical Multicast Channel (PMCH). The PSS/SSS and Cell-specific Reference Signal (CRS) in subframes 0 and 5 are used for cell search and time and frequency tracking.

As specified in 3GPP TS 36.304 v13.2.0, the Frequency Division Duplex (FDD) UEs are calculating the Paging Occasions they need to monitor (when the P-RNTI is transmitted on Physical Downlink Control Channel (PDCCH) or Narrowband PDCCH (NPDCCH_ or on MTC PDCCH (MPDCCH) with system bandwidth>3 MHz) using following table:

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 | where i_s = floor(UE_ID/N) mod Ns, N: min(T, nB), Ns: max(1, nB/T) and nB: 4T, 2T, T, T/2, T/4, T/8, T/16, T/32.

The nB parameter is configurable by the network and signaled in SIB2 (as part of the pcch-Config IE, which in turn is part of the radioResourceConfigCommon IE). It can be noted that by configuring nB<=T it is possible to limit PO occurrences to sub-frame #9 only without having to consider UE_ID or DRX cycle length configured for the UE.

The Evolved Universal Terrestrial Radio Access Network (E-UTRAN) paging message is defined in 3GPP TS 36.331 v13.2.0. It contains information both about one or more UEs that are being paged with the message (as UE identities) as well as other information that is addressed to many or all UEs. Paging is used to:
 transmit paging information to a UE in RRC_IDLE and/or;
 inform UEs in RRC_IDLE and UEs in RRC_CONNECTED about a system information change and/or;
 inform about an Earthquake and Tsunami Warning Service (ETWS) primary notification and/or ETWS secondary notification and/or;
 inform about a Compatible Commercial Alert System (CMAS) notification and/or;
 inform UEs in RRC_IDLE about an EAB parameters modification and/or;
 inform UEs in RRC_IDLE to perform E-UTRAN interfrequency redistribution procedure.

In MTC work, a Direct Indication information is defined in 3GPP TS 36.331 and conveyed to the UE by DCI format 6-2 defined in 3GPP TS 36.212.

Table 6.6-1 in 3GPP TS 36.331 v13.2.0 defines the Direct Indication information. When bit n is set to 1, the UE shall behave as if the corresponding field is set in the Paging message, as described in sub-clause 5.3.2.3 in 3GPP TS 36.331 v13.2.0. Bit 1 is then the least significant bit.

TABLE 6.6-1

Direct Indication information

| Bit | Field in Paging message |
|---|---|
| 1 | systemInfoModification |
| 2 | etws-Indication |
| 3 | cmas-Indication |
| 4 | eab-ParamModification |
| 5 | systemInfoModification-eDRX |
| 6, 7, 8 | Not used, and shall be ignored by UE if received. |

Further, a UE receiving eMBMS service needs to follow eMBMS specific system information given in the Multicast Control Channel (MCCH). The change notification of the MCCH is given in Downlink Control Information (DCI) 1C as an 8 bit bitmap where each bit corresponds to one MBSFN area. The UE receives the MBSFN area information in the MBSFN-AreaInfoList information element, included in SystemInformationBlockType13, where a parameter notificationIndicator describes which bit position in the bitmap corresponds to this MBSFN area.

```
MBSFN-AreaInfoList information element

-- ASN1START
MBSFN-AreaInfoList-r9 ::=         SEQUENCE (SIZE(1..maxMBSFN-Area)) OF MBSFN-
                                  AreaInfo-r9
MBSFN-AreaInfo-r9 ::=             SEQUENCE {
    mbsfn-AreaId-r9                   MBSFN-AreaId-r12,
    non-MBSFNregionLength             ENUMERATED {s1, s2},
    notificationIndicator-r9          INTEGER (0..7),
    mcch-Config-r9                    SEQUENCE {
        mcch-RepetitionPeriod-r9          ENUMERATED {rf32, rf64, rf128, rf256},
        mcch-Offset-r9                    INTEGER (0..10),
        mcch-ModificationPeriod-r9        ENUMERATED {rf512, rf1024},
        sf-AllocInfo-r9                   BIT STRING (SIZE(6)),
        signallingMCS-r9                  ENUMERATED {n2, n7, n13, n19}
    },
    ...
}
-- ASN1STOP
```

The DCI 1C for MCCH change notification is defined in 3GPP TS 36.212 as follows:
 Else if the format 1C is used for notifying MCCH change Information for MCCH change notification—8 bits as defined in section 5.8.1.3 of [6]
 Reserved information bits are added until the size is equal to that of format 1C used for very compact scheduling of one PDSCH codeword On the Further Enhanced MBMS (FeMBMS) carrier there will be some subframes where at least PSS/SSS and CRS is transmitted even with 100% eMBMS subframe allocation. Any DCI can be sent to UE in the PDCCH region of these subframes and the Physical Downlink Shared Channel (PDSCH) of these subframes may be used to carry SI information or unicast.

As per the WID objective b) the UE may be served by unicast traffic from the Rel-14 FeMBMS carrier only if that cell is configured to that UE as SCell. Thus, from idle mode UE perspective, the FeMBMS carrier is comparable to downlink only carrier independent of whether the carrier offers unicast traffic to some connected mode UEs along with respective UL or not. The WID objective d) defines all DL subframes as eMBMS subframes, thus as a standalone carrier. The Rel-14 FeMBMS carrier would thus not serve unicast traffic and it can thereby be concluded that paging for incoming calls is not needed for Rel-14 FeMBMS.

Currently there is also no option to limit paging occasions to only subframes 0 and 5, which would be needed in order to transmit paging on the carrier where sub-frames 4 and 9 are configured as MBSFN. Such a carrier would thus not support paging according to the current mapping of Paging Occasions to subframes.

A Rel-14 FeMBMS carrier can be DL only, meaning that it is not possible to respond to a paging message on that carrier. It would thus not be useful to perform paging on such a Rel-14 FeMBMS carrier.

According to objective d) of the WID, support for a standalone carrier, with all DL subframes dedicated to MBSFN transmission and self-contained eMBMS signaling, is to be studied. A UE that is monitoring only such a carrier, e.g. a UE that is only interested in eMBMS reception, will thus not be reachable with paging messages.

A problem is that the paging messages are also used to convey other information, such as e.g.:
a system information modification indication;
an indication of an ETWS notification;
an indication of a CMAS notification;
an indication that there is a modification of the Extended Access Barring (EAB) parameters;
an indication to trigger E-UTRAN inter-frequency redistribution procedure.

This information would still be needed for the eMBMS carrier, which does not support paging messages, e.g. in order to enable UEs that are only monitoring such a carrier reception of ETWS and/or CMAS notifications.

One solution would be to reuse the Direct Indication Information. This would require the UE to monitor both DCI 1C scrambled by M-RNTI as well as DCI 6-2 (which includes the Direct Indication Information) which is not scrambled by M-RNTI and would require the UE to monitor MPDCCH in addition to PDCCH.

For eMBMS, it better to send the update information as a group message because eMBMS is a broadcast transmission that should be receivable by idle mode UEs. Thus, instead of UE specific MPDCCH, it is better to use common search space of PDCCH and a group identifier like M-RNTI. When send like this, 8 bits are needed for MCCH change notification because there are multiple MBMS areas and one UE may see simultaneously more than one overlapping MBMS areas.

FIG. 1 shows a wireless communication system 10 according to some embodiments. As shown, the system 10 includes a radio network node 12 shown as a base station, and further includes a wireless device 14 (e.g., a user equipment, UE). The radio network node 12 is configured to generate and transmit an update signal 16 to wireless devices 14 in the system 10 that are not or cannot monitor a paging channel, and therefore that are not reachable via a paging channel or via a MTC control channel. The update signal includes update indication information 20. The update indication information includes at least one indication unrelated to paging the wireless devices 14.

In some embodiments, for example, the radio network node 12 transmits control information 18 for a multicast or broadcast service, e.g., over a physical downlink control channel (PDCCH) or a MTC PDCCH (MPDCCH). The update indication information 20 in this case includes one or more indications being updated, e.g., indications that may otherwise may be included with paging information, but are unrelated to paging the wireless device 14. Exemplary indications included in the update indication information include, but are not limited to, a system information modification indication, an indication of an Earthquake and Tsunami Warning System (ETWS) notification, an indication of a Commercial Mobile Alert System (CMAS) notification, an indication of a modification of the Extended Access Barring (EAB) parameters, and an indication to trigger an (E-UTRAN) inter-frequency redistribution procedure. In some embodiments, devices monitor for such signals anyways, for some other purpose. This means that the update indication information may be piggybacked onto other messages, including those messages used for other purposes. Exploiting the multi-purpose nature of the signals in this way, some embodiments may reduce power consumption and/or radio resource usage.

Figure 2A:
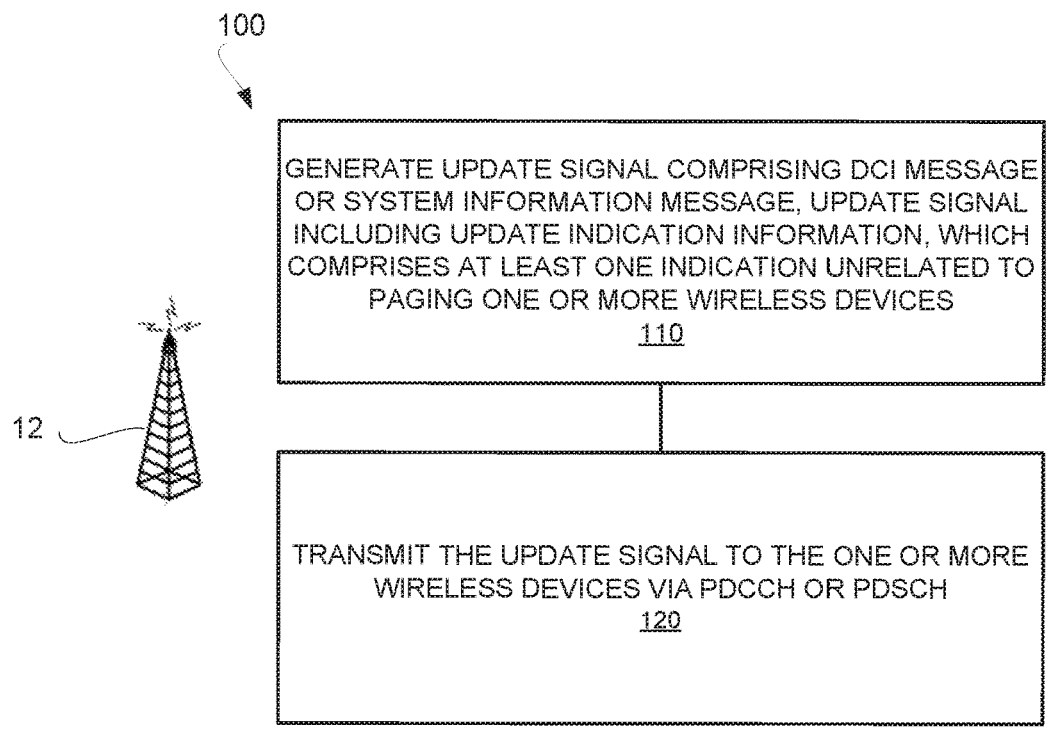
FIG. 2A shows a radio network node transmission method according to one exemplary embodiment.

FIG. 2A accordingly shows one exemplary method 100 performed by a radio network node 12 according to some embodiments. Method 100 comprises generating an update signal comprising a Downlink Control Information (DCI) message or a system information message by including the update indication information in the update signal (Block 110). The update indication information comprises at least one indication unrelated to paging the one or more wireless devices. Method 100 further includes transmitting the update signal to wireless devices 14 in the wireless communication system via one of a PDCCH and a PDSCH (Block 120). Thus, the wireless devices 14 are still able to receive the update indication information even when the wireless devices 14 are unreachable via the paging channel or the MTC control channel. By "unreachable" via these channels, the solution disclosed herein refers to those wireless devices that cannot be paged because these channels do not exist on the carrier received by the wireless device, because the wireless device is not monitoring or is unable to monitor these channels, because the information is not sent via these channels, and/or because the wireless device cannot receive these channels.

Figure 2B:
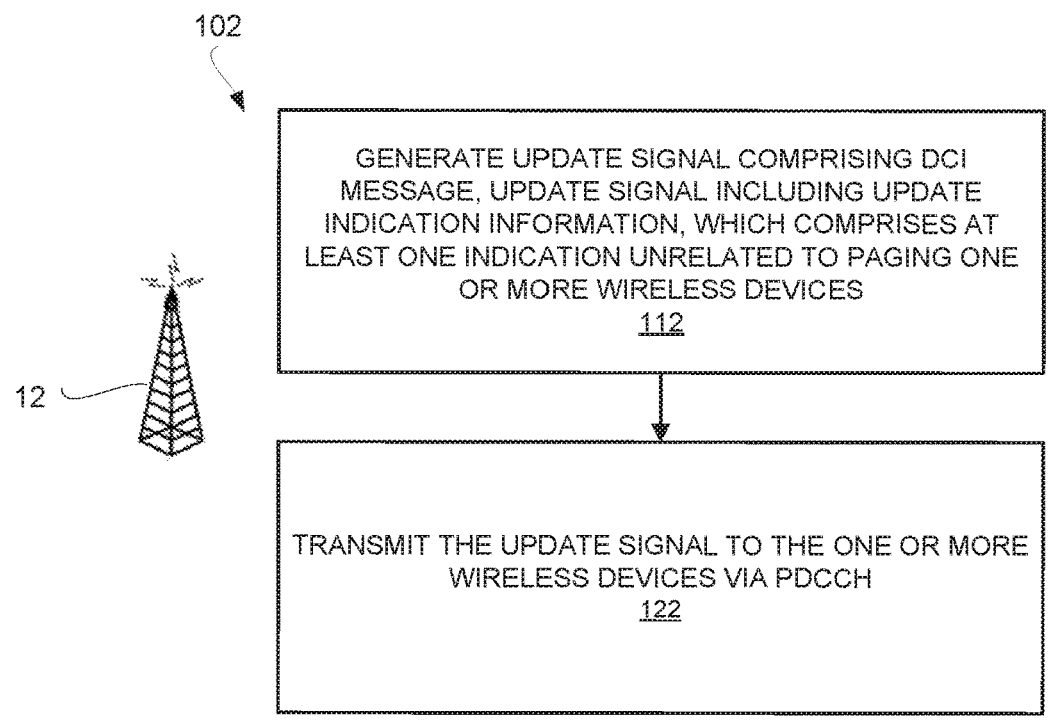
FIG. 2B shows a radio network node transmission method according to another exemplary embodiment.
Figure 3A:
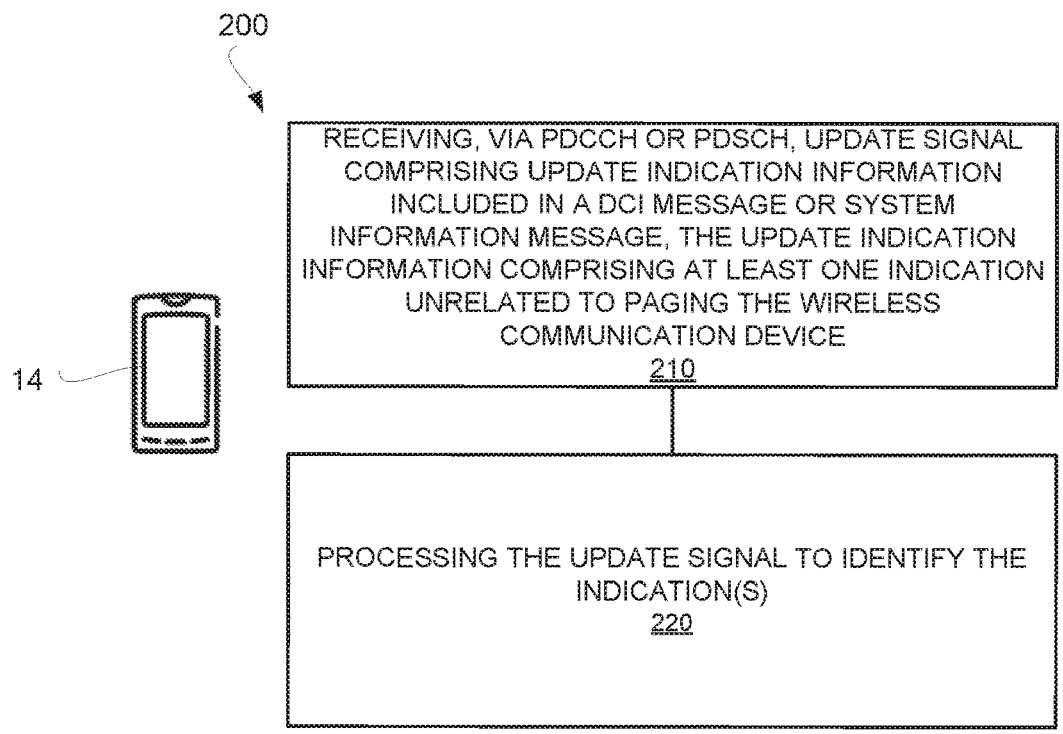
FIG. 3A shows a wireless device reception method according to one exemplary embodiment.

FIG. 2B shows another exemplary method 102 performed by a radio network node 12 according to another embodiment. Method 102 comprises generating an update signal comprising a Downlink Control Information (DCI) message by including the update indication information in the update signal (Block 112). The update indication information comprises at least one indication unrelated to paging the one or more wireless devices. Method 102 further includes transmitting the update signal to wireless devices 14 in the wireless communication system via a PDCCH (Block 122). Thus, the wireless devices 14 are still able to receive the update indication information even when the wireless devices 14 are unreachable via the paging channel or the MTC control channel. By "unreachable" via these channels, the solution disclosed herein refers to those wireless devices that cannot be paged because these channels do not exist on the carrier received by the wireless device, because the wireless device is not monitoring or is unable to monitor these channels, because the information is not sent via these channels, and/or because the wireless device cannot receive these channels. FIG. 3A shows a corresponding method 200 performed by a wireless device 14 according to some embodiments. As shown, method 200 includes receiving, via one of a PDCCH and a PDSCH, an update signal comprising update indication information included in a DCI message or a system information message, where the update indication information comprises at least one indication unrelated to paging the wireless device (Block 210). The method 200 further includes processing the update signal to determine the at least one indication (Block 220).

Figure 3B:
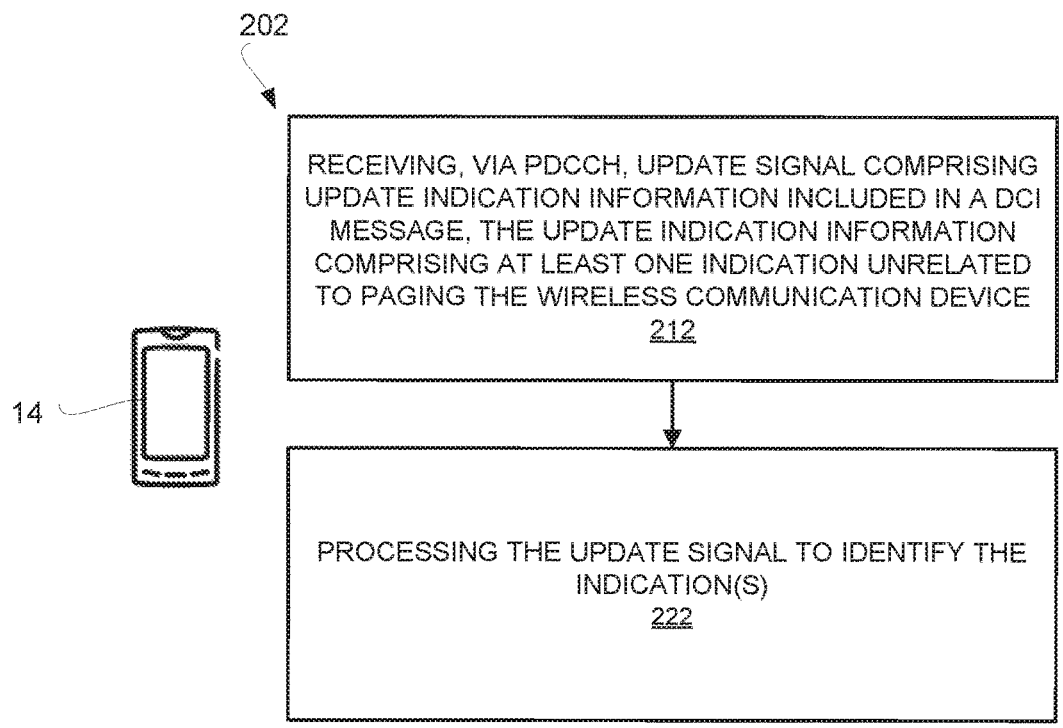
FIG. 3B shows a wireless device reception method according to another exemplary embodiment.

FIG. 3B shows a method 202 performed by a wireless device 14 according to another embodiment. As shown, method 202 includes receiving, via a PDCCH, an update signal comprising update indication information included in a DCI message, where the update indication information comprises at least one indication unrelated to paging the wireless device (Block 212). The method 200 further includes processing the update signal to determine the at least one indication (Block 222).

One advantage of generating and transmitting an update signal in the form of a DCI message transmitted via PDCCH is that it enables the wireless device 14 to receive the update indication information directly in the DCI message instead of first receiving a DCI message informing the wireless device where to find a system information message in the PDSCH and then reading the system information message to receive the update indication information. In some exemplary embodiments, the DCI message comprises a DCI 1C message, which may or may not include DII and/or a MCCH change notification. In other exemplary embodiments, the DCI message is formatted using a format different than DCI 1C. An advantage of using DCI 1C message, as compared to a DCI message having a different format, is that the wireless device only need to descramble DCI messages using M-RNTI in order to receive the update information and the MCCH change notification instead of having to descramble DCI messages using both M-RNTI and e.g. C-RNTI. In some exemplary embodiments, the system information message is transmitted on a carrier with no support for paging messages, e.g., a Rel-14 eMBMS carrier. In some exemplary embodiments, some or all of the update indication information is included in a primary system information message, where any update indication information not included in the primary system information message may be included in a secondary system information message.

Figure 4:
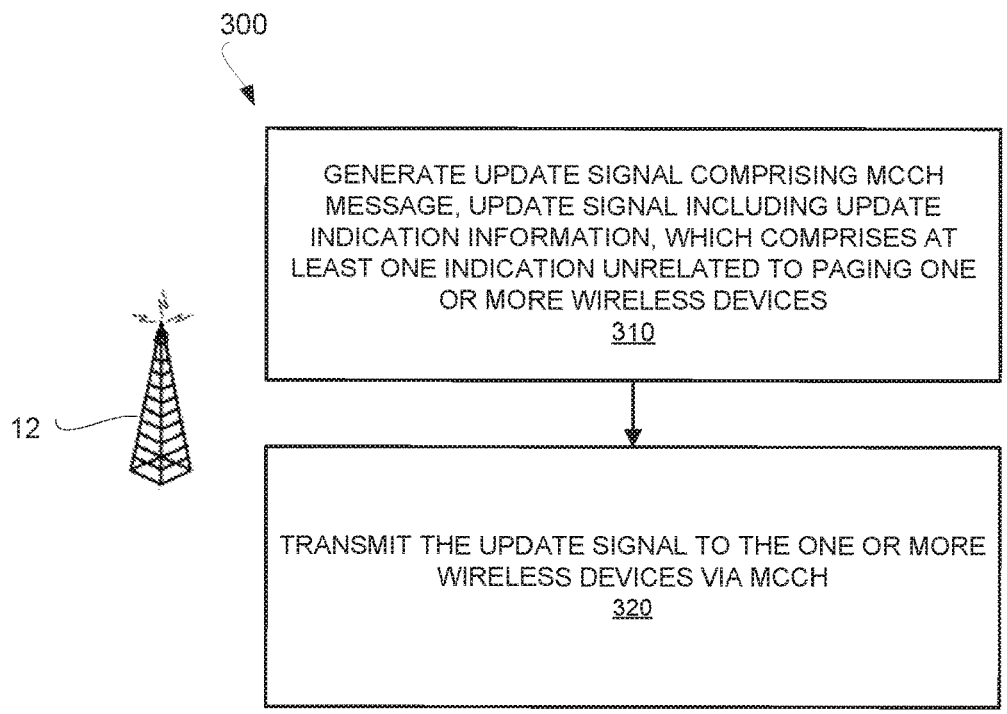
FIG. 4 shows a radio network node transmission method according to another exemplary embodiment.

FIG. 4 shows another exemplary method 300 performed by a radio network node 12 according to other embodiments. Method 300 comprises generating an update signal comprising an MCCH message by including the update indication information in the update signal (Block 310). The update indication information comprises at least one indication unrelated to paging the one or more wireless devices. Method 300 further includes transmitting the update signal to wireless devices 14 in the wireless communication system via the MCCH (Block 320). Thus, the wireless devices 14 are still able to receive the update indication information even when the wireless devices 14 are unreachable via a paging channel or the MTC control channel.

Figure 5:
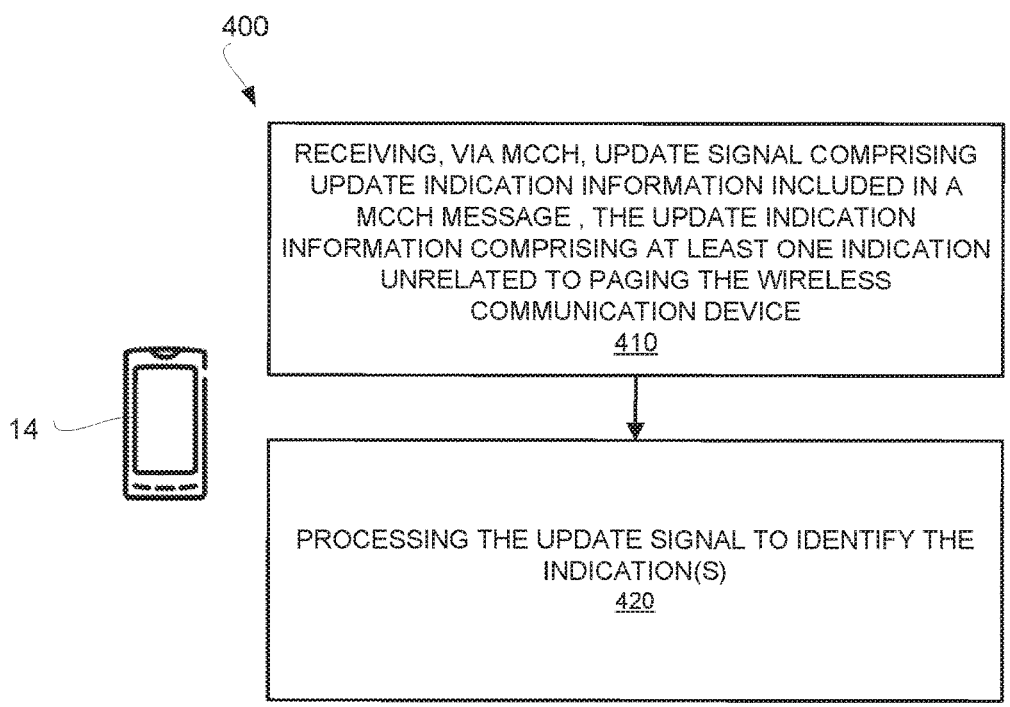
FIG. 5 shows a wireless device reception method according to another exemplary embodiment.

FIG. 5 shows a corresponding method 400 performed by a wireless device 14 according to some embodiments. As shown, method 400 includes receiving, via the MCCH, an update signal comprising update indication information included in an MCCH message, where the update indication information comprises at least one indication unrelated to paging the wireless device (Block 410). The method 200 further includes processing the update signal to determine the at least one indication (Block 420).

In some exemplary embodiments, at least some of the update indication information is included in a MBSFN Area Configuration message.

Note that embodiments herein are applicable to any type of wireless communication system capable of multicast or broadcast transmission. Nonetheless, some embodiments are particularly applicable or suitable for NB-IoT, eMTC, or other successors to the E-UTRAN.

Indeed, there has been a lot of work in 3GPP lately on specifying technologies to cover Machine-to-Machine (M2M) and/or Internet of Things (IoT) related use cases. Most recent work for 3GPP Release 13 includes enhancements to support Machine-Type Communications (MTC) with a new UE category M1 (Cat-M1), supporting reduced bandwidth of up to 6 physical resource blocks (PRBs), and Narrowband IoT (NB-IoT) work item specifying a new radio interface (and UE category NB1, Cat-NB1).

LTE enhancements introduced in 3GPP Release 13 for MTC will be referred to as "eMTC", including (not limiting) support for bandwidth limited UEs, Cat-M1, and support for coverage enhancements. This is to separate discussion from NB-IoT, although the supported features are similar on a general level.

There are multiple differences between "legacy" LTE and the procedures and channels defined for eMTC work (likewise for NB-IoT). Some important differences include a physical downlink control channel, referred to as MPDCCH when used in eMTC and NPDCCH when used in NB-IoT.

A few alternative solutions to the above-mentioned problem are proposed here. One exemplary embodiment includes the Rel-14 FeMBMS relevant information from the Direct Indication Information in DCI format 1C where the UE receives update of the MCCH. The maximum payload on DCI 1C is 31 bits which leaves 23 bits for the needed information from Direct Indication Information after the 8 bits used for MCCH update. Size of Direct Indication Information is as well 8 bits, thus all of it can be included as well. In addition, it can include the indication to trigger E-UTRAN inter-frequency redistribution procedure which is not part of the Direct Indication Information but is part of paging message. Further on, we call all these indications added to DCI 1C in addition to MCCH update bitmap, an "update indication" or "update indication information."

Another exemplary embodiment includes the "update indication" in a system information message that is sent on the carrier with no support for paging messages, such as the one for Rel-14 eMBMS. In one embodiment the system information that is sent on such a carrier is divided into two different parts:

- A primary eMBMS_SIB that the UEs monitors in order to receive part of or all of "update indication". In addition it could include certain system information that is beneficial to be monitored with this periodicity. At least information about where the secondary eMBMS_SIB is sent and information about what other SIBs that are sent (in case more than the primary eMBMS_SIB and the secondary eMBMS_SIB are transmitted).
- A secondary eMBMS_SIB to include the rest of the needed System Information. An exception may be the System Information related to ETWS and CMAS notifications, which are included in SIB10+SIB11 and SIB12, respectively.

Another embodiment comprises defining a DCI, different from DCI 1C, which can be used in scheduling the eMBMS SIB and which includes the "update indication" or part of it. When UE reads this DCI, it knows from the DCI whether it needs to further read the eMBMS SIB or not. The scheduled eMBMS SIB may be a SIB including all or part of the SI needed for Rel-14 FeMBMS In another embodiment, the information about the ongoing ETWS and/or CMAS notifications is detected by the UE by reading the information about the scheduling of the System Information on the carrier. The information about System Information scheduling (corresponding to the schedulingInfoList in SIB1) would then, as an option, be included in the primary eMBMS_SIB. The UE would then determine that there is an ongoing ETWS notification by detecting that SIB10 or SIB11 is being scheduled and that there is an ongoing CMAS notification by detecting that SIB12 is being scheduled.

The proposed solution enables the transmission of information about e.g. system information modifications as well as ETWS and CMAS notifications to UEs that are monitoring a Rel-14 eMBMS carrier, where paging messages are not supported. The UEs are then not required to monitor an MTC Physical Downlink Control Channel (MPDCCH) in addition to the Physical Downlink Control Channel (PDCCH). Further, all embodiments describe a broadcast manner to indicate system information change which enables also idle mode UEs and "receive only mode" UEs to receive the information.

The proposed solution includes methods for a radio network node to transmit information about e.g. system information modifications, ETWS and/or CMAS notifications being transmitted, modifications of EAB parameters and/or a trigger of an E-UTRAN inter-frequency redistribution procedure to a User Equipment (UE), which is monitoring an E-UTRAN carrier/cell where no paging messages are transmitted.

In a first embodiment the information about e.g. system information modifications, ETWS and/or CMAS notifications being transmitted, modifications of EAB parameters and/or a trigger of an E-UTRAN inter-frequency redistribution procedure, is included in the DCI format 1C, which is sent on the PDCCH. Further on, we call all these indications added to DCI 1C, an "update indication". A UE that is receiving an eMBMS service, or interested in receiving an eMBMS service, may already receive notifications about MCCH changes in the DCI format 1C. That is, the DCI 1C may include both the update information and MCCH notification bit map or one of those. This solution enables the wireless device to retrieve both the MCCH notification and the update information by reading a single DCI message.

The information about system information modifications, ETWS and/or CMAS notifications being transmitted, modifications of EAB parameters and/or a trigger of an E-UTRAN inter-frequency redistribution procedure, that is, the update information or part of it, is included either:
  as part of the option for MCCH change notification in DCI format 1C, which then contains both the update indication information and the MCCH change notification; or
  as a separate option for the DCI format 1C, which then only contains the update indication information or part of it The UE that monitors the PDCCH periodically for notifications about MCCH changes will then receive the update information or part of it together with (or instead of) the MCCH change notification.

In another embodiment, the update information or part of it is transmitted on the MCCH. The information is then added as a new or additional message that is sent on the MCCH or included in one of the existing MCCH messages, e.g. the MBSFNAreaConfiguration-r9 Message.

In another embodiment, the update information or part of it is included in the system information that is transmitted on the carrier where paging messages are not being transmitted (e.g. a Rel-14 FeMBMS carrier).

In one embodiment the system information that is sent on such a carrier is then divided into two different parts:

A primary eMBMS_SIB that contains the update information or part of it. This system information is scheduled regularly in order for the UE to quickly detect changes to the included information, e.g. when there is a new ETWS notification being transmitted. In addition the primary eMBMS_SIB could include certain other system information that is beneficial to be monitored with this periodicity and information about the scheduling about other SIBs.

A secondary eMBMS_SIBSI to include the rest of the needed SI System Information. An exception may be the System Information related to ETWS and CMAS notifications, which are included in SIB10+SIB11 and SIB12, respectively.

In another embodiment, define a DCI, different from the DCI 1C, which can be used in scheduling the eMBMS SIB and which includes the "update indication" or part of it. When UE reads this DCI, it knows from the DCI whether it needs to further read the eMBMS SIB or not. The scheduled eMBMS SIB may be a SIB including all or part of the SI needed for Rel-14 FeMBMS In another embodiment, the information about the ongoing ETWS and/or CMAS notifications is detected by the UE by reading the information about the scheduling of the other SIBs (corresponding to the schedulingInfoList in SIB1 in 3GPP TS 36.331). This information is then, as an option, included in the primary eMBMS_SIB. The UE would then determine that there is an ongoing ETWS notification by detecting that SIB10 or SIB11 is being scheduled on the carrier and that there is an ongoing CMAS notification by detecting that SIB12 is being scheduled.

As an addition, the here proposed solutions can also be applied on a carrier/in a cell where paging messages are being scheduled. As an example, this would be beneficial in case there are UEs that are not monitoring the paging channel (e.g. if they are not reachable by paging). Those UEs would then not be required to monitor the paging channel (paging messages) in order to receive the other information included there.

Figure 6:
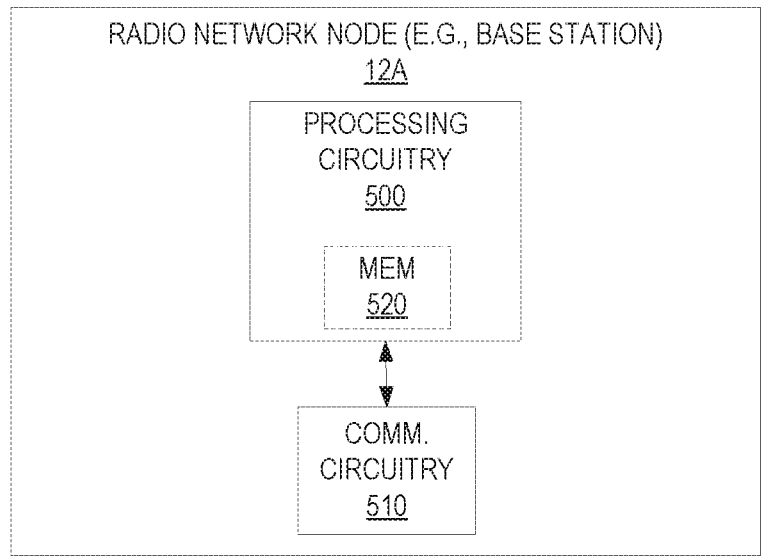
FIG. 6 shows a block diagram of a radio network node according to one exemplary embodiment.

FIG. 6 shows the radio network node 12 in the form of a radio network node 12A in accordance with one or more embodiments. As shown, radio network node 12A includes a processor circuitry 500 and communication circuitry 510. The communication circuitry 510 is configured to transmit and/or receive information to and/or from one or more other nodes, e.g., via any communication technology. Such communication may occur via one or more antennas that are either internal or external to the radio network node 12A. The processor circuitry 500 is configured to perform processing described above, e.g., in FIG. 2A, 2B, or 4, such as by executing instructions stored in memory 520. The processor circuitry 500 in this regard may implement certain functional means, units, or modules.

Figure 7:
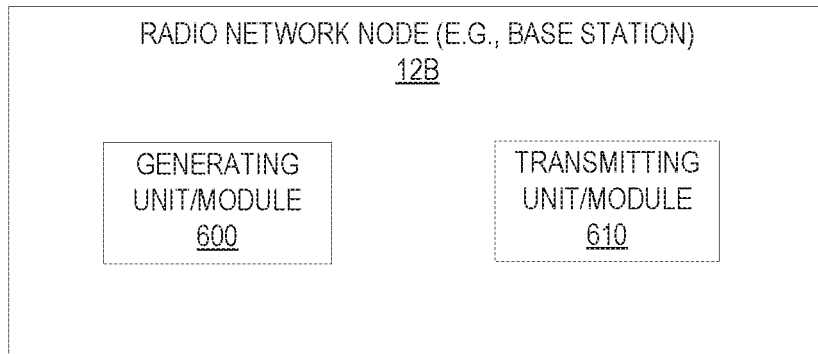
FIG. 7 shows a block diagram of a radio network node according to another exemplary embodiment.

FIG. 7 shows the radio network node 12 in the form of a radio network node 12B implemented in accordance with one or more other embodiments. As shown, radio network node 12B implements various functional means, units, or modules, e.g., via the processor circuitry 500 in FIG. 6 and/or via software code. These functional means, units, or modules include, e.g., a generating module 600 and a transmitting module 610, e.g., for performing the generating and transmitting in FIG. 2A, FIG. 2B, and/or FIG. 4.

Also note that a wireless device 14 as described above may perform the method 200 in FIG. 3A, the method 202 in FIG. 3B, or the method 400 in FIG. 5, and any other processing herein by implementing any functional means or units. In one embodiment, for example, the wireless device 14 comprises respective circuits or circuitry configured to perform the steps shown in FIG. 3A, FIG. 3B, and/or FIG. 5. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 8:
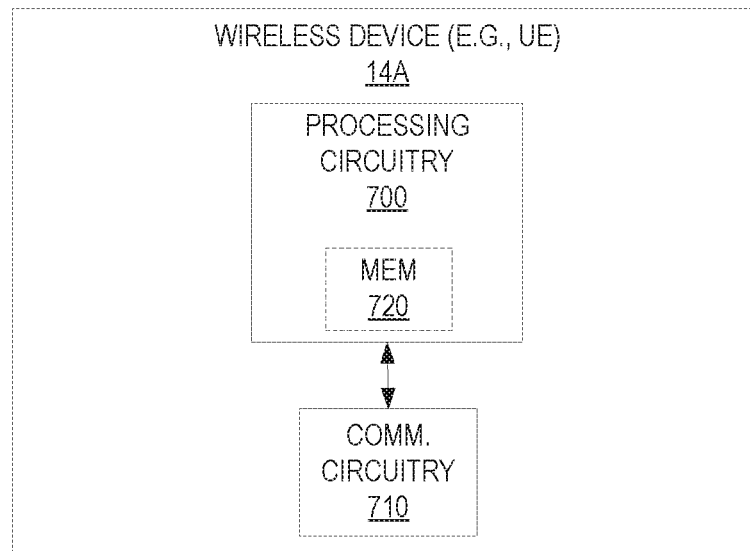
FIG. 8 shows a block diagram of a wireless device according to one exemplary embodiment.

FIG. 8 shows the wireless device 14 in the form of a wireless device 14A in accordance with one or more embodiments. As shown, wireless device 14A includes processor circuitry 700 and communication circuitry 710. The communication circuitry 710 is configured to transmit and/or receive information to and/or from one or more other nodes, e.g., via any communication technology. Such communication may occur via one or more antennas that are either internal or external to the wireless device 14A. The processor circuitry 700 is configured to perform processing described above, e.g., in FIG. 3A, FIG. 3B, and/or FIG. 5, such as by executing instructions stored in memory 720. The processor circuitry 700 in this regard may implement certain functional means, units, or modules.

Figure 9:
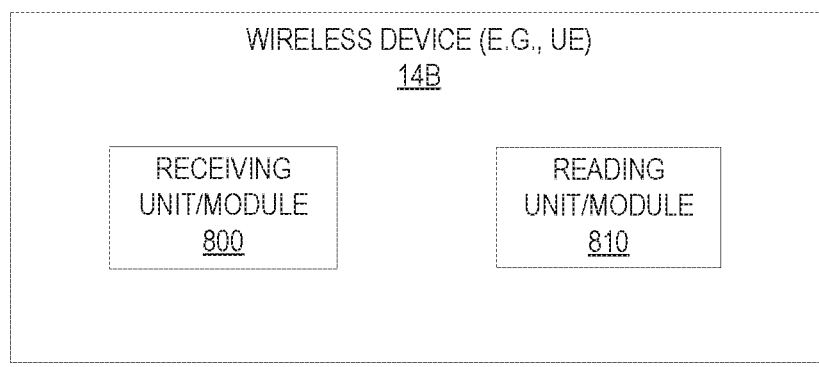
FIG. 9 shows a block diagram of a wireless device according to another exemplary embodiment.

FIG. 9 shows the wireless device 14 in the form of a wireless device 14B implemented in accordance with one or more other embodiments. As shown, wireless device 14B implements various functional means, units, or modules, e.g., via the processor circuitry 700 in Figure and/or via software code. These functional means, units, or modules include for instance a receiving module 800 and a reading module 810, e.g., for performing the receiving and reading in FIG. 3A, FIG. 3B, and/or FIG. 5.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium.

The solution disclosed herein may, of course, be carried out in other ways than those specifically set forth herein without departing from essential characteristics of the solution. The present embodiments are to be considered in all respects as illustrative and not restrictive, and all changes coming within the meaning and equivalency range of the appended embodiments are intended to be embraced therein.

Example embodiments may include:
1. A method of providing update indication information from a radio network node to one or more wireless devices unreachable via a paging channel or a machine-type communication (MTC) control channel, the method comprising:
   generating an update signal comprising one of a Downlink Control Information (DCI) message and a system information message by including the update indication information in the update signal, the update indication information comprising at least one indication unrelated to paging the one or more wireless devices; and
   transmitting the update signal to the one or more wireless devices via one of a Physical Downlink Control Channel (PDCCH) and a Physical Downlink Shared Channel (PDSCH) when the one or more wireless devices are unreachable via the paging channel or the MTC control channel.
2. The method of embodiment 1 wherein the at least one indication unrelated to paging the wireless device comprises at least one of a system information modification indication, an indication of an Earthquake and Tsunami Warning System (ETWS) notification, an indication of a Commercial Mobile Alert System (CMAS) notification, an indication of a modification of the Extended Access Barring (EAB) parameters, and an indication to trigger an (E-UTRAN) inter-frequency redistribution procedure.
3. The method of embodiments 1-2 wherein the DCI message comprises a DCI format 1C message.
4. The method of embodiment 3 wherein the DCI format 1C message further includes at least one of Direct Indication Information (DII) and a Multicast Control Channel (MCCH) change notification.
5. The method of embodiments 1-2 wherein when the update signal comprises the system information message, transmitting the update signal comprises transmitting the update signal on a carrier with no support for paging messages.
6. The method of embodiment 5 wherein the carrier comprises a Rel-14 eMBMS carrier.
7. The method of embodiments 5-6 wherein generating the update signal comprises including some or all of the update indication information in a primary system information message.
8. The method of embodiments 5-7 wherein when only some of the update indication information is included in the primary system information message, generating the update signal further comprises including the remaining update indication information in a secondary system information message.
9. The method of embodiments 1-2 wherein the DCI message is configured for scheduling a system information block for MBMS in a DCI format different from a DCI format 1C.
10. A method of providing update indication information from a radio network node to one or more wireless devices unreachable via a paging channel or a machine-type communication (MTC) control channel, the method comprising:
    generating an update signal comprising a Multicast Control Channel (MCCH) message, the update signal including the update indication information comprising at least one indication unrelated to paging the one or more wireless devices; and
    transmitting the update signal to the one or more wireless devices via the MCCH when the one or more wireless devices are unreachable via the paging channel or the MTC control channel.

11. The method of embodiment 10 wherein the at least one indication unrelated to paging the wireless device comprises at least one of a system information modification indication, an indication of an Earthquake and Tsunami Warning System (ETWS) notification, an indication of a Commercial Mobile Alert System (CMAS) notification, an indication of a modification of the Extended Access Barring (EAB) parameters, and an indication to trigger an (E-UTRAN) inter-frequency redistribution procedure.

12. The method of embodiments 10-11 wherein generating the update signal comprises including at least some of the update indication information in a Multimedia Broadcast Multicast Service (MBMS) Single Frequency Network (MBSFN) Area Configuration message.

13. A method of handling update indication information transmitted from a radio network node and received by a wireless device unreachable via a paging channel or a machine-type communication (MTC) control channel, the method comprising:
    receiving, via one of a Physical Downlink Control Channel (PDCCH) and a Physical Downlink Shared Channel (PDSCH), an update signal comprising update indication information included in one of a Downlink Control Information (DCI) message and a system information message, the update indication information comprising at least one indication unrelated to paging the wireless device; and
    processing the update signal to determine the at least one indication.

14. The method of embodiment 13 wherein the at least one indication unrelated to paging the wireless device comprises at least one of a system information modification indication, an indication of an Earthquake and Tsunami Warning System (ETWS) notification, an indication of a Commercial Mobile Alert System (CMAS) notification, an indication of a modification of the Extended Access Barring (EAB) parameters, and an indication to trigger an (E-UTRAN) inter-frequency redistribution procedure.

15. The method of embodiments 13-14 wherein the DCI message comprises a DCI format 1C message.

16. The method of embodiment 15 wherein the DCI format 1C message further includes at least one of Direct Indication Information (DII) and a Multicast Control Channel (MCCH) change notification.

17. The method of embodiments 13-14 wherein when the update signal comprises the system information message, receiving the update signal comprises receiving the update signal on a carrier with no support for paging messages.

18. The method of embodiment 17 wherein the carrier comprises a Rel-14 eMBMS carrier.

19. The method of embodiments 17-18 wherein when the received update signal comprises a primary system information message including some or all of the update indication information.

20. The method of embodiments 17-19 wherein when only some of the update indication information is included in the primary system information message, receiving the update signal further comprises receiving a secondary system information message comprised in the update signal, said secondary system information message including the remaining update indication information.

21. The method of embodiments 13-14 wherein the DCI message is configured for scheduling a system information block for MBMS in a DCI format different from a DCI format 1C.

22. The method of embodiments 13-14 wherein receiving the update signal comprises receiving a primary System Information Block (SIB) message comprised in the update signal, and wherein processing the received update signal comprises interpreting an element of the primary SIB message associated with scheduling another SIB as at least one of the indications in the update indication information.

23. The method of embodiment 22 wherein processing the received update signal comprises interpreting scheduling of SIB10 or SIB11 in the SIB message as an ETWS notification and interpreting scheduling of SIB 12 in the SIB message as an indication of a CMAS notification.

24. A method of handling update indication information transmitted from a radio network node and received by a wireless device unreachable via a paging channel or a machine-type communication (MTC) control channel, the method comprising:
    receiving, via a Multicast Control Channel (MCCH), an update signal comprising update indication information included in a MCCH message, the update indication information comprising at least one indication unrelated to paging the wireless device; and
    processing the update signal to determine the at least one indication.

25. The method of embodiment 24 wherein the at least one indication unrelated to paging the wireless device comprises at least one of a system information modification indication, an indication of an Earthquake and Tsunami Warning System (ETWS) notification, an indication of a Commercial Mobile Alert System (CMAS) notification, an indication of a modification of the Extended Access Barring (EAB) parameters, and an indication to trigger an (E-UTRAN) inter-frequency redistribution procedure.

26. The method of embodiments 24-25 wherein the received update signal includes at least some of the update indication information in a Multimedia Broadcast Multicast Service (MBMS) Single Frequency Network (MBSFN) Area Configuration message.

27. A radio network node configured to provide update indication information to one or more wireless devices unreachable via a paging channel or a machine-type communication (MTC) control channel, the radio network node comprising:
    a processor circuit configured to generate an update signal comprising one of a Downlink Control Information (DCI) message and a system information message by including the update indication information in the update signal, the update indication information comprising at least one indication unrelated to paging the one or more wireless devices; and
    a communication circuit configured to transmit the update signal to the one or more wireless devices via one of a Physical Downlink Control Channel (PDCCH) and a Physical Downlink Shared Channel (PDSCH) when the one or more wireless devices are unreachable via the paging channel or the MTC control channel.

28. The radio network node of embodiment 27 wherein the at least one indication unrelated to paging the wireless device comprises at least one of a system information modification indication, an indication of an Earthquake and Tsunami Warning System (ETWS) notification, an indication of a Commercial Mobile Alert System (CMAS) notification, an indication of a modification of the Extended Access Barring (EAB) parameters, and an indication to trigger an (E-UTRAN) inter-frequency redistribution procedure.

20. The radio network node of embodiments 27-28 wherein the DCI message comprises a DCI format 1C message.

30. The radio network node of embodiment 29 wherein the DCI format 1C message further includes at least one of Direct Indication Information (DII) and a Multicast Control Channel (MCCH) change notification.

31. The radio network node of embodiments 27-28 wherein when the update signal comprises the system information message, the communication circuit is configured to transmit the update signal by transmitting the update signal on a carrier with no support for paging messages.

32. The radio network node of embodiment 31 wherein the carrier comprises a Rel-14 eMBMS carrier.

33. The radio network node of embodiments 31-32 wherein the processor circuit generates the update signal by including some or all of the update indication information in a primary system information message.

34. The radio network node of embodiments 31-33 wherein when only some of the update indication information is included in the primary system information message, the processor circuit further generates the update signal by including the remaining update indication information in a secondary system information message.

35. The radio network node of embodiments 27-28 wherein the DCI message is configured for scheduling a system information block for MBMS in a DCI format different from a DCI format 1C.

36. A radio network node configured to provide update indication information to one or more wireless devices unreachable via a paging channel or a machine-type communication (MTC) control channel, the radio network node comprising:
 a processor circuit configured to generate an update signal comprising a Multicast Control Channel (MCCH) message, the update signal including the update indication information comprising at least one indication unrelated to paging the one or more wireless devices; and
 a communication circuit configured to transmit the update signal to the one or more wireless devices via the MCCH when the one or more wireless devices are unreachable via the paging channel or the MTC control channel.

37. The radio network node of embodiment 36 wherein the at least one indication unrelated to paging the wireless device comprises at least one of a system information modification indication, an indication of an Earthquake and Tsunami Warning System (ETWS) notification, an indication of a Commercial Mobile Alert System (CMAS) notification, an indication of a modification of the Extended Access Barring (EAB) parameters, and an indication to trigger an (E-UTRAN) inter-frequency redistribution procedure.

38. The radio network node of embodiments 36-37 wherein the processor circuit generates the update signal by including at least some of the update indication information in a Multimedia Broadcast Multicast Service (MBMS) Single Frequency Network (MBSFN) Area Configuration message.

39. A wireless device configured to handle update indication information from a radio network node, said wireless device unreachable via a paging channel or a machine-type communication (MTC) control channel, the wireless device comprising:
 a communication circuit configured to receive, via one of a Physical Downlink Control Channel (PDCCH) and a Physical Downlink Shared Channel (PDSCH), an update signal comprising update indication information included in one of a Downlink Control Information (DCI) message and a system information message, the update indication information comprising at least one indication unrelated to paging the wireless device; and
 a processor circuit configured to process the update signal to determine the at least one indication.

40. The wireless device of embodiment 39 wherein the at least one indication unrelated to paging the wireless device comprises at least one of a system information modification indication, an indication of an Earthquake and Tsunami Warning System (ETWS) notification, an indication of a Commercial Mobile Alert System (CMAS) notification, an indication of a modification of the Extended Access Barring (EAB) parameters, and an indication to trigger an (E-UTRAN) inter-frequency redistribution procedure.

41. The wireless device of embodiments 39-40 wherein the DCI message comprises a DCI format 1C message.

42. The wireless device of embodiment 41 wherein the DCI format 1C message further includes at least one of Direct Indication Information (DII) and a Multicast Control Channel (MCCH) change notification.

43. The wireless device of embodiments 39-40 wherein when the update signal comprises the system information message, the communication circuit receives the update signal by receiving the update signal on a carrier with no support for paging messages.

44. The wireless device of embodiment 43 wherein the carrier comprises a Rel-14 eMBMS carrier.

45. The wireless device of embodiments 43-44 wherein the received update signal comprises a primary system information message including some or all of the update indication information.

46. The wireless device of embodiments 43-45 wherein when only some of the update indication information is included in the primary system information message, the communication circuit further receives the update signal by receiving a secondary system information message comprised in the update signal, the secondary system information message including the remaining update indication information.

47. The wireless device of embodiments 39-40 wherein the DCI message is configured for scheduling a system information block for MBMS in a DCI format different from a DCI format 1C.

48. The wireless device of embodiments 30-40 wherein the communication circuit receives the update signal by receiving a primary System Information Block (SIB) message comprised in the update signal, and wherein the processor circuit processes the received update signal by interpreting an element of the primary SIB message associated with scheduling another SIB as at least one of the indications in the update indication information.

49. The wireless device of embodiment 48 wherein the processor circuit processes the received update signal by interpreting scheduling of SIB10 or SIB11 in the SIB message as an ETWS notification and interpreting scheduling of SIB 12 in the SIB message as an indication of a CMAS notification.

50. A wireless device configured to handle update indication information from a radio network node, the wireless device unreachable via a paging channel or a machine-type communication (MTC) control channel, the wireless device comprising:
 a communication circuit configured to receive, via a Multicast Control Channel (MCCH), an update signal comprising update indication information included in a MCCH message, the update indication information comprising at least one indication unrelated to paging the wireless device; and a processor circuit configured to process the update signal to determine the at least one indication.

51. The wireless device of embodiment 50 wherein the at least one indication unrelated to paging the wireless device comprises at least one of a system information modification indication, an indication of an Earthquake and Tsunami Warning System (ETWS) notification, an indication of a Commercial Mobile Alert System (CMAS) notification, an indication of a modification of the Extended Access Barring (EAB) parameters, and an indication to trigger an (E-UTRAN) inter-frequency redistribution procedure.

52. The wireless device of embodiments 50-51 wherein the received update signal includes at least some of the update indication information in a Multimedia Broadcast Multicast Service (MBMS) Single Frequency Network (MBSFN) Area Configuration message.

53. A computer program product stored in a non-transitory computer readable medium for controlling a radio network node configured to provide update indication information from a radio network node to one or more wireless devices unreachable via a paging channel or a machine-type communication (MTC) control channel, the computer program product comprising software instructions which, when run on a processor circuit in the radio network node, causes the radio network node to:

generate an update signal comprising one of a Downlink Control Information (DCI) message and a system information message by including the update indication information in the update signal, the update indication information comprising at least one indication unrelated to paging the one or more wireless devices; and transmit the update signal to the one or more wireless devices via one of a Physical Downlink Control Channel (PDCCH) and a Physical Downlink Shared Channel (PDSCH) when the one or more wireless devices are unreachable via the paging channel or the MTC control channel.

54. A computer program product stored in a non-transitory computer readable medium for controlling a radio network node configured to provide update indication information from a radio network node to one or more wireless devices unreachable via a paging channel or a machine-type communication (MTC) control channel, the computer program product comprising software instructions which, when run on a processor circuit in the radio network node, causes the radio network node to:

generate an update signal comprising a Multicast Control Channel (MCCH) message, the update signal including the update indication information comprising at least one indication unrelated to paging the one or more wireless devices; and transmit the update signal to the one or more wireless devices via the MCCH when the one or more wireless devices are unreachable via the paging channel or the MTC control channel.

55. A computer program product stored in a non-transitory computer readable medium for controlling a wireless device configured to handle update indication information from a radio network node, the wireless device unreachable via a paging channel or a machine-type communication (MTC) control channel, the computer program product comprising software instructions which, when run on a processor circuit in the wireless device, causes the wireless device to:

receive, via one of a Physical Downlink Control Channel (PDCCH) and a Physical Downlink Shared Channel (PDSCH), an update signal comprising update indication information included in one of a Downlink Control Information (DCI) message and a system information message, the update indication information comprising at least one indication unrelated to paging the wireless device; and process the update signal to determine the at least one indication.

56. A computer program product stored in a non-transitory computer readable medium for controlling a wireless device configured to handle update indication information from a radio network node, the wireless device unreachable via a paging channel or a machine-type communication (MTC) control channel, the computer program product comprising software instructions which, when run on a processor circuit in the wireless device, causes the wireless device to:

receive, via a Multicast Control Channel (MCCH), an update signal comprising update indication information included in a MCCH message, the update indication information comprising at least one indication unrelated to paging the wireless device; and process the update signal to determine the at least one indication.

What is claimed is:

1. A method of providing update indication information from a radio network node to one or more wireless devices unreachable via a paging channel or a machine-type communication (MTC) control channel, the method comprising:

generating an update signal comprising a Downlink Control Information (DCI) message by including the update indication information in the update signal, the update indication information comprising at least one indication unrelated to paging the one or more wireless devices; and transmitting the update signal to the one or more wireless devices via a Physical Downlink Control Channel (PDCCH) when the one or more wireless devices are unreachable via the paging channel or the MTC control channel because the paging channel or the MTC control channel does not exist on a carrier received by the one or more wireless devices;

wherein the at least one indication unrelated to paging the wireless device comprises at least one of a system information modification indication, an indication of a Commercial Mobile Alert System (CMAS) notification, an indication of a modification of the Extended Access Barring (EAB) parameters, and an indication to trigger an Evolved Universal Terrestrial Radio Access Network (E-UTRAN) inter-frequency redistribution procedure.

2. The method of claim 1 wherein the DCI message comprises a DCI format 1C message.

3. The method of claim 2 wherein the DCI format 1C message comprises both the update indication information and a Multicast Control Channel (MCCH) change notification.

4. A method of handling update indication information received by a wireless device from a radio network node when said wireless device is unreachable via a paging channel or a machine-type communication (MTC) control channel because the paging channel or the MTC control channel does not exist on a carrier received by the wireless device, the method comprising:

receiving, via a Physical Downlink Control Channel (PDCCH) an update signal comprising update indication information included in a Downlink Control Information (DCI) message, the update indication information comprising at least one indication unrelated to paging the wireless device; and processing the update signal to determine the at least one indication;

wherein the at least one indication unrelated to paging the wireless device comprises at least one of a system information modification indication, an indication of a Commercial Mobile Alert System (CMAS) notification, an indication of a modification of the Extended Access Barring (EAB) parameters, and an indication to trigger an Evolved Universal Terrestrial Radio Access Network (E-UTRAN) inter-frequency redistribution procedure.

5. The method of claim 4 wherein the DCI message comprises a DCI format 1C message.

6. The method of claim 5 wherein the DCI format 1C message comprises both the update indication information and a Multicast Control Channel (MCCH) change notification.

7. A radio network node configured to provide update indication information to one or more wireless devices unreachable via a paging channel or a machine-type communication (MTC) control channel, the radio network node comprising:

a processor circuit configured to generate an update signal comprising a Downlink Control Information (DCI) message by including the update indication information in the update signal, the update indication information comprising at least one indication unrelated to paging the one or more wireless devices; and a communication circuit configured to transmit the update signal to the one or more wireless devices via a Physical Downlink Control Channel (PDCCH) when the one or more wireless devices are unreachable via the paging channel or the MTC control channel because the paging channel or the MTC control channel does not exist on a carrier received by the one or more wireless devices;

wherein the at least one indication unrelated to paging the wireless device comprises at least one of a system information modification indication, an indication of a Commercial Mobile Alert System (CMAS) notification, an indication of a modification of the Extended Access Barring (EAB) parameters, and an indication to trigger an Evolved Universal Terrestrial Radio Access Network (E-UTRAN) inter-frequency redistribution procedure.

8. The radio network node of claim 7 wherein the DCI message comprises a DCI format 1C message.

9. The radio network node of claim 8 wherein the DCI format 1C message comprises both the update indication information and a Multicast Control Channel (MCCH) change notification.

10. A wireless device configured to handle update indication information from a radio network node when said wireless device is unreachable via a paging channel or a machine-type communication (MTC) control channel because the paging channel or the MTC control channel does not exist on a carrier received by the wireless device, the wireless device comprising:

a communication circuit configured to receive, via a Physical Downlink Control Channel (PDCCH) an update signal comprising update indication information included in a Downlink Control Information (DCI) message, the update indication information comprising at least one indication unrelated to paging the wireless device; and a processor circuit configured to process the update signal to determine the at least one indication;

wherein the at least one indication unrelated to paging the wireless device comprises at least one of a system information modification indication, an indication of a Commercial Mobile Alert System (CMAS) notification, an indication of a modification of the Extended Access Barring (EAB) parameters, and an indication to trigger an Evolved Universal Terrestrial Radio Access Network (E-UTRAN) inter-frequency redistribution procedure.

11. The wireless device of claim 10 wherein the DCI message comprises a DCI format 1C message.

12. The wireless device of claim 11 wherein the DCI format 1C message comprises both the update indication information and a Multicast Control Channel (MCCH) change notification.

13. A computer program product stored in a non-transitory computer readable medium for controlling a radio network node configured to provide update indication information from the radio network node to one or more wireless devices unreachable via a paging channel or a machine-type communication (MTC) control channel, the computer program product comprising software instructions which, when run on a processor circuit in the radio network node, causes the radio network node to:

generate an update signal comprising a Downlink Control Information (DCI) message by including the update indication information in the update signal, the update indication information comprising at least one indication unrelated to paging the one or more wireless devices; and transmit the update signal to the one or more wireless devices via a Physical Downlink Control Channel (PDCCH) when the one or more wireless devices are unreachable via the paging channel or the MTC control channel because the paging channel or the MTC control channel does not exist on a carrier received by the one or more wireless devices;

wherein the at least one indication unrelated to paging the wireless device comprises at least one of a system information modification indication, an indication of a Commercial Mobile Alert System (CMAS) notification, an indication of a modification of the Extended Access Barring (EAB) parameters, and an indication to trigger an Evolved Universal Terrestrial Radio Access Network (E-UTRAN) inter-frequency redistribution procedure.

14. A computer program product stored in a non-transitory computer readable medium for controlling a wireless device configured to handle update indication information from a radio network node, the wireless device unreachable via a paging channel or a machine-type communication (MTC) control channel because the paging channel or the MTC control channel does not exist on a carrier received by the one or more wireless devices, the computer program product comprising software instructions which, when run on a processor circuit in the wireless device, causes the wireless device to:

receive, via a Physical Downlink Control Channel (PDCCH) an update signal comprising update indication information included in a Downlink Control Information (DCI) message, the update indication information comprising at least one indication unrelated to paging the wireless device; and process the update signal to determine the at least one indication;

wherein the at least one indication unrelated to paging the wireless device comprises at least one of a system information modification indication, an indication of a Commercial Mobile Alert System (CMAS) notification, an indication of a modification of the Extended Access Barring (EAB) parameters, and an indication to trigger an Evolved Universal Terrestrial Radio Access Network (E-UTRAN) inter-frequency redistribution procedure.

* * * * *